United States Patent [19]
Bedini

[11] Patent Number: 5,487,057
[45] Date of Patent: Jan. 23, 1996

[54] APPARATUS AND METHOD FOR REDUCING ELECTRONIC RELAXATION NOISE PRESENT INFORMATION RECORDING MEDIUM

[75] Inventor: John C. Bedini, Coeur d'Alene, Id.

[73] Assignee: Bedini Electronics, Inc., Coeur d'Alene, Id.

[21] Appl. No.: 264,074

[22] Filed: Jun. 22, 1994

Related U.S. Application Data

[63] Continuation-in-part of Ser. No. 15,897, Feb. 10, 1993, abandoned, and a continuation of Ser. No. 897,892, Jun. 12, 1992, abandoned, which is a continuation of Ser. No. 521,690, May 8, 1990, abandoned.

[51] Int. Cl.$^6$ .................................................. G11B 7/00
[52] U.S. Cl. ............................................. 369/107; 369/126
[58] Field of Search ................................... 369/107, 126

[56] References Cited

PUBLICATIONS

H. C. Ohanian, "On The Aproach of Electro–Magneto–Static Equilibrium", Am. Journal of Physics, vol. 51, Nov., 1983, pp. 1020–1022.

Erik J. Bochove and John Walkup, "A Communication on Electrical Charge Relaxation in Metals", Am. Journal of Physics, vol. 58, pp. 131–134, Feb. 1990.

Electronics Engineer's Reference Book, 5th Edn., Ed. by F. Mazda, 1983, p. 50/3.

B. Yavorsky and A. Detlaf, Handbook of Physics, MIR Publishers, Moscow, revised from the Russian 1977 edition, p. 178.

Webster's II New Riverside University Dictionary, 1984, p. 992.

H. S. Min and Doyeol Ahn, "Lengevin Noise Sources for the Boltzmann Transport Equations with the Relaxation–time Approximation in Nondegenerate Semiconductors", J. of Applied Physics, vol. 58 (6), Sep. 15, 1985, pp. 2262–2265.

S. Vitale et. al., "Magnetic Viscosity, Thermal Relaxation, and Thermal Equilibrium Noise in Co–based Amorphous Alloys at MilliKelvin Temperatures", J. of Applied Physics, vol. 72 (10), Nov. 15, 1992, pp. 4820–4825.

K. G. Moh, et. at., "Equivalent Noise Source for Boltzmann Transport Equation with Relaxation–time Approximation in Nondegenerate Semiconductors", J. of Applied Physics, vol. 74 (10), Nov., 15, 1993, pp. 6217–6221.

Primary Examiner—Georgia Y. Epps
Assistant Examiner—Kim-Kwok Chu
Attorney, Agent, or Firm—Thomas G. Walsh

[57] ABSTRACT

A method and apparatus is provided for reducing relaxation noise in a conducting medium. The device is fabricated by affixing two magnets at like, repelling poles; wrapping said magnets with a coil of wire in an orientation orthogonal to the interface between the joined magnets and the like poles of the magnets to form a magnetic unit; connecting said coil to a motor means, an electrical power supply means and a switch means; attaching a spindle to said motor means. The spindle receives said conducting medium. The apparatus can be in a housing. The conducting medium is placed on said spindle. By activating the device, a modulated magnetic electromagnetic field is created simultaneous to the spinning of the conducting medium. The information recording medium rotates through the modulated electromagnetic field, thereby reducing the relaxation noise.

19 Claims, 6 Drawing Sheets

APPARATUS AND METHOD FOR REDUCING ELECTRONIC RELAXATION NOISE PRESENT INFORMATION RECORDING MEDIUM

CROSS-REFERENCE TO RELATED APPLICATIONS

This is a Continuation-in-Part application of File Wrapper Continuation Application, 08/015,897, filed Feb. 10, 1993, herein abandoned; File Wrapper Continuation Application, 07/897,892, filed Jun. 12, 1992, abandoned; and Parent Application 07/521,690, filed May 8, 1990, abandoned.

BACKGROUND OF THE INVENTION

1. Field of the Invention

The invention relates to the general field of playback of recorded conducting media or conductors, more specifically, an apparatus and method that reduces electronic relaxation noise, also known as "linger noise", that exists in information recording medium.

2. Description of Related Art and Information

The utility of the present invention is based on fundamental laws of nuclear and electronic physics at the electron level, particularly with respect to electron gas relaxation phenomena in conductors immediately preceding the initiation of normal current flow per ohms law.

For current to flow through a medium conductor or a conducting plate (conductor) that involves electromagnetic (EM) effects in recording and playback, and in transmission of signals, and thus to provide signals through normal circuitry, conducting plates, etc., a finite time is required before the flow is established, and before stability, referred to as a "stable signal" or stable flow pattern, can be established. This time delay is referred to as electron gas relaxation time.

The relaxation phenomenon involves at least three major stages, all of which must be substantially completed before the relaxation time is actually complete, and coherent signals or patterns are being transmitted in the conductor. Further, the relaxation time involves damped oscillations.

The first stage in the relaxation time is the relaxation of the electrical charge density. Electrons initially distributed throughout the conductor are "excited" by taking on excess energy in the form of potential gradients across them. They are now substantially involved in working their way to the surface, since most of the current flow must occur on the surface of the conductor, not in its interior. If the total charge is not zero, a very highly non-linear first phase results, and the division between first and second stages is substantially blurred.

A simplifying assumption is made, that the initial charge is zero, so that the compensated charge fluctuations may be described by linear equations. Then the relaxation of electrical charge density can be assumed to be mostly independent of the initial conditions and of the size and shape of the conductor.

Treating the Drude electron gas model as applicable, and assuming each electron is independent of the rest, damped harmonic oscillator equations result for the relaxation. This yields a short relaxation time for stage 1. This erroneously short relaxation time basically results from assuming that the electrons move rather independently and are de-coupled. With coupling remaining as is almost always the case, a combination of stage 1 and stage 2 actually applies immediately, and sometimes an extra combination of stage 3 as well Much "noise" known as small field perturbations in random directions, is present during phase 1. This is because of the random motion of the electrons in all directions, as the addition of the excess energy to them essentially results in an increase in the average electron's kinetic energy and increases the violence and frequency of their collisions with the lattice and with each other.

The second stage is the expulsion of the electric and magnetic fields to the exterior of the conductor, and the expulsion of the excited electrons as axial currents (on the average) to the surface. This electron movement during the second stage is still immersed in the midst of a great collision/violence among the electrons in the electron gas in the conductor. Accordingly, there are erratic electric and magnetic fields from the erratically moving charges, whose violent movements are, in fact, expelling these fields from the conductor and in all directions in the conductor. Consequently, there is much noise, distortion and scattering going on in this stage.

In the third stage, the electrons reach the skin of the conductor, resulting in a marked decrease in collision frequency and violence. The relaxation process terminates with the slower ohmic and radiative damping of the surface currents.

As an end result of the three relaxation stages, a sinusoidal charge disturbance is formed and propagated in the conductor with a phase velocity $V_p$ of roughly $1 \times 10^8$ cm/sec, or roughly $10^6$ meters per second. Further, this disturbance is extremely noisy. It is also moving far slower than the speed of light, hence "lingers" in a circuit after each and every stimulation, directly adding noise to slightly succeeding "signal stimuli." The "signal" moves down the conductor at nearly C, the velocity of light in space.

The net result in a continual digital process is that the 3-stage relaxation phenomena continually generates lingering noise signals in a circuit. This noise is continually produced both when signals are initially recorded on a conductor, increasing the noise in the signal actually recorded, and again when the conducting medium is later optically re-stimulated to detect the recorded "signal and noise". Examples of conducting media are audio compact disc, CD-ROM (read only memory), video laser disc, photo-CD and photgraphic film. The net result is that continual relaxation noise is added to both the recording and playback stages of any recording process utilizing such a conducting medium. Relaxation noise is also added to any signal translated down or in a conductor and through circuits.

In searching prior art that disclosed magnetic and/or modulated EM devices designed for processing or clarifying conducting media for the purpose of reducing relaxation noise, no references were located that either disclosed or anticipated the present invention.

SUMMARY OF THE INVENTION

The device is a housed magnetic unit that, when electrically activated by a switch and motor means, creates a modulated EM beam or field that dampens and reduces electron relaxation or linger noise in a recorded conducting medium as the conducting medium passes through the EM field.

DETAILED DESCRIPTION OF THE INVENTION

The method and apparatus or device of the present invention is discussed hereinafter in terms of 3-stage relaxation noise actually introduced to all signal conducting media by the recording process, and again introduced in the playback from such recorded conducting media.

First, the sharp distinction between the first and second relaxation stages is removed. The moment the charges present in the electron gas in a conductor are excited with excess energy from the leading part of the incoming signal stimulus, excess fields exist on the electrons, directly combining with the E- and B-fields already in existence. Consequently, stages 1 and 2 are considered combined. In other words, even in stage one, a strong component of the excited fields is attempting to axially eject or expel electrons from the conductor, while other strong fields oriented within the conductor are affecting the entire electron gas, increasing its collision frequency and noise. Axially, there is less collision damping, so on the average an axial movement toward the surface results. Axial expulsion is a radial effect.

Next is the effect of an additional magnetic field from an external magnetic pole, which is what the present invention provides. The magnetic pole, for example, may be fairly localized in the case of recording signals and replaying signals, or it may be distributed in a "cover" or "blanket" covering the outside surface of the conductor. In the case of flat conducting plates, the blanket may cover both sides.

When any field element attempts to emerge from the conductor, or can be decomposed into longitudinal and axial components where the axial component attempts to emerge, it is directly coupled to one or more axially (on the average) moving electrons within the plate, which constitutes the source or sources of the fields. The source electrons are also attempting to move to the surface themselves. However, the strength of the electron-associated magnetic field will be altered, affected and resisted by the externally introduced modulated EM field of the present invention.

The net effect of the magnetic field, as produced by the present invention, is to induce damping and "magnetic braking" of the electrons and damping of their fields. In addition, a moving electron in a magnetic field is forced to turn away from its path, again increasing damping. In the externally introduced modulated EM field of the present device, the axially (on the average) moving electron is forced to develop an electric field gradient at right angles to its (on the average) axial movement, and "back against" the "linger noise" stimulus. In short, the electron develops a "back EMF" from all of the other electrons in the gas, which resist its movement and damp it. This dampens the electron's axial component, consequently its movement and concomitant relaxation "stage 1" and "stage 2" noise, resulting in a materially reduced relaxation noise.

The result of the use of the present invention, is that as the electrons continue to violently alter their directions due to collisions, they are continually damped by the modulated EM field created by the device. Consequently, the erratic movement of the electrons are constrained, their velocities are lowered, their collision frequency is diminished, and relaxation noise is reduced, compared to the situation where no external EM field is present. The net result is a reduction of relaxation or linger noise resulting in clarifying of audio and/or visual signals from the conductor.

When the external modulated EM field of the present invention crosses the relaxation excitation E-fields of the conductor, longitudinal components on the electrons, in either direction, are produced which contribute to the overall damping. The fundamental principle is that, as the electrons increase their kinetic energy during stage 1 and stage 2 of the relaxation time, that increase is being resisted by a magnetic braking/damping effect, and the axial ejection and noise components that continually develop are damped by the introduced EM field.

This results in a reduction in the production of both immediate and linger noise. It is the mirror symmetry of the "magnetic brake" effect. The excited electrons try to move faster, in effect creating "eddy currents" in the conductor. Moving in the fixed magnet's modulated EM field, these "eddy currents" exert a magnetic repulsion force upon the magnetic pole, which in turn exerts a braking effect back upon the "eddy currents" themselves. This latter effect constitutes noise reduction in the conductor.

The end total result of the use of the device of the present device is:

1. Reduction of the velocity and kinetic energy of the electrons during coupled phase 1 and phase 2;

2. introduction of substantial additional damping upon the harmonic damped-oscillation relaxation noise that results in phases 1, 2 and 3,; and 3. substantial reduction of the overall relaxation noise in the system, in the resulting conducting medium, and in the resulting playback from the conducting medium.

The device directly reduces the relaxation noise in all conducting media which involve EM effects in recording and playback, and in transmission of signals. In any operating system, whether recording or playback as such is being performed or not, the present device directly reduces the continuously-forming "lingering relaxation noise" from signals that have previously occurred, and that are actually slower-moving charge disturbances constituting relaxation noise in the system's operation. The relaxation noise is also a power loss from the signal. Reduction of the signal power being lost in the system constitutes effective enhancement of the noise-free power transmitted by the system.

Application of the device increases the signal-to-noise ratio by dramatically reducing the lingering relaxation noise that is continually produced in: 1) systems operation; 2) the conducting medium; and 3) detection, amplification, and playback from the conducting medium. Media conductors or conducting plates that the apparatus may be applied to are audio compact discs, CD-ROM discs, photographic compact discs, video laser discs, motion picture and still-camera film of all types, x-ray film, optical media, and other medium which involve EM effects in recording and playback and in the transmission of signals through normal circuitry and conducting plates. Video, audio and digital tapes also benefit from the present invention but conducting tape must be treated with the device before recorded upon.

The systems may be any EM system such as electrical, electro-optical, magnetic, and magneto-optical systems. The continuously-formed lingering relaxation noise is a direct part of the so-called "standard noise" in the system.

When the device is applied to a conductor, such as an audio compact disc (CD) that normally produces playback distortion as a result of relaxation noise, the distortion is reduced and there is an improvement in sound quality with improved clarity and sharpness of the music or other such sounds. When the apparatus is applied to a medium that has a visual expression, such as a CD-ROM, Photo-CD, video laser disc or photogaphic film, there is improved visual effects with greater clarity, sharpness and color to the resultant pictures and photographs.

One embodiment of the invention is a device comprised of a pair of permanent magnets in an orientation in which their like poles, i.e., north or south, are in a facing and repulsing relationship. A coil of wire is then wound around the pair of fixed magnets in an orientation orthogonal to both the interface between the facing magnets and their north and south poles.

A motor means and electric supply means is provided for creating a pulsed current characterized by sharp voltage spikes to the coil of wire creating a modulated EM field while also producing a means for spinning the conducting medium when placed on a spindle that is driven by the motor means. A far greater effect is given by the brushes of the motor means when DC current is applied at a constant rate. At the same time, the motor means provides a more constant means of maintaining optimum rotation of the spindle thus exposing the conductor to the constant effect of the EM field.

The molded spindle allows for improved centering and stability during rotation of the conducting medium. The conducting medium is oriented to the device so that its plane is parallel to a plane running through the north pole orientation of the magnets. As the conducting medium passes through the modulated EM field, the electrons of the conductor are effected by the field, thus reducing the relaxation noise.

The device is housed in a container, such as a molded plastic housing, to maintain magnetic unit placement and to allow for greater penetration of the modulate magnetic field by the magnetic unit and with greater effect on the conductor.

One application of the device of the present invention is in clarifying sounds emitting from an audio compact disc. Compact discs are comprised of an aluminum surface encased in a plastic coating. The disc itself is composed of a very thin piece of stamped aluminum, which is the conducting medium, encased in plastic. The thin aluminum layer is the active ingredient that contains the recorded data.

A second application is in the clarification of compact discs such as video laser discs, photo-CDs and CD-ROMs. Processing of visual compact discs produces a clearer, sharper, brighter and more colorful image both on the computer screen and in a photo image.

A third application is in the clarifying of photographic films of all types. Exposed film that has been clarified before developing the film produces a consistantly clearer image than film that is unclarified.

Figure 1:
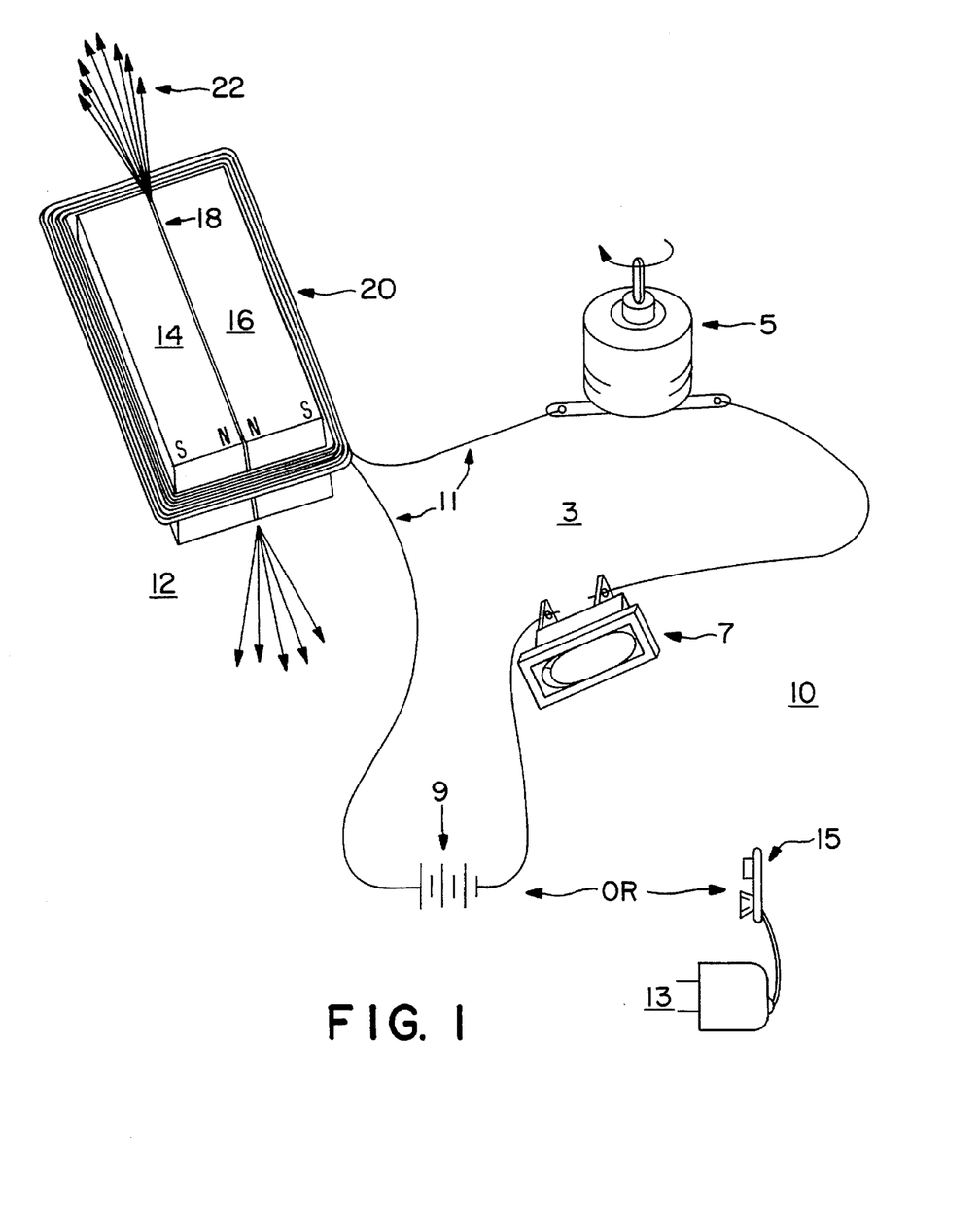
FIG. 1 is a perspective view of a device that produces a permanent magnet magnetic field.

Referring first to FIG. 1, 10 is a device comprised of a magnetic unit 12 which is further comprised of a pair of permanent magnets 14 and 16 orientated with like poles in a facing, contacting and repelling relationship and fused with an adhesive means 18 forming a seam with joined magnets 14 and 16 producing a shaped magnetic field 22. Magnets 14 and 16 are oriented with their north poles in an abutting relationship, although the magnets may be abutted using their south poles.

FIG. 1 further shows a coil of wire 20 wound around magnets 14 and 16 of the magnetic unit's out facing poles with coil 20 having an orientation perpendicular to the plane of the interface between magnets 14 and 16. Coil 20 may consist of 150 to 300 turns of a #34 enamel-insulated high temperature wire, with 250 turns preferable. Magnetic field 22 is shown emitting above adhesive seam 18 of magnetic unit 12.

Also shown in FIG. 1 is circuitry 3 for providing an electrical supply to coil 20 of magnetic unit 12 used in apparatus 10. Circuitry 3 is comprised of a DC motor 5, a controlling switch 7, either a 9 volt DC battery or a DC power supply 9 and connecting wire 11 to coil 20. DC motor 5 also provides a means for rotating spindle 33 seen in FIG. 2. In the alternative, electrical power may be provided by a 120 volt AC power supply 13 which is reduced to 9 volts by passing through a 9 volt AC to DC convertor or power step-down unit 15.

Figure 2:
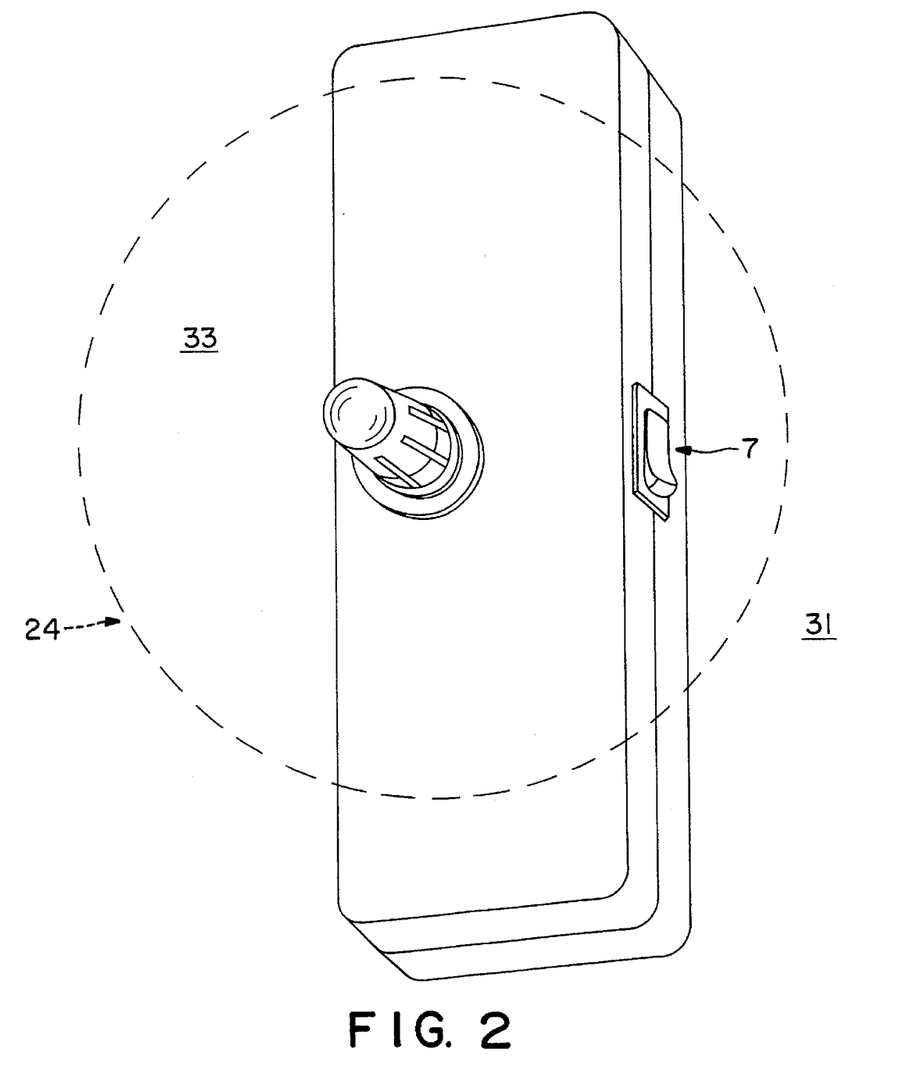
FIG. 2 is a perspective view of the outside of a housing for the apparatus.

FIG. 2 is a perspective view of a housing 31 which contains apparatus 10 and its components. Seen emerging from the top of housing 31 is spindle 33 for the placement and orientation of conducting medium 24. Spindle 33 emerges from the top side of housing 31 for ease of placement of the conducting medium. Closure of switch 7 creates a modulated EM field 22 simultaneous to the spinning of conducting medium 24. As the conducting medium spins, it passes through field 22 thus producing the desired effect on the conductor.

Figure 3:
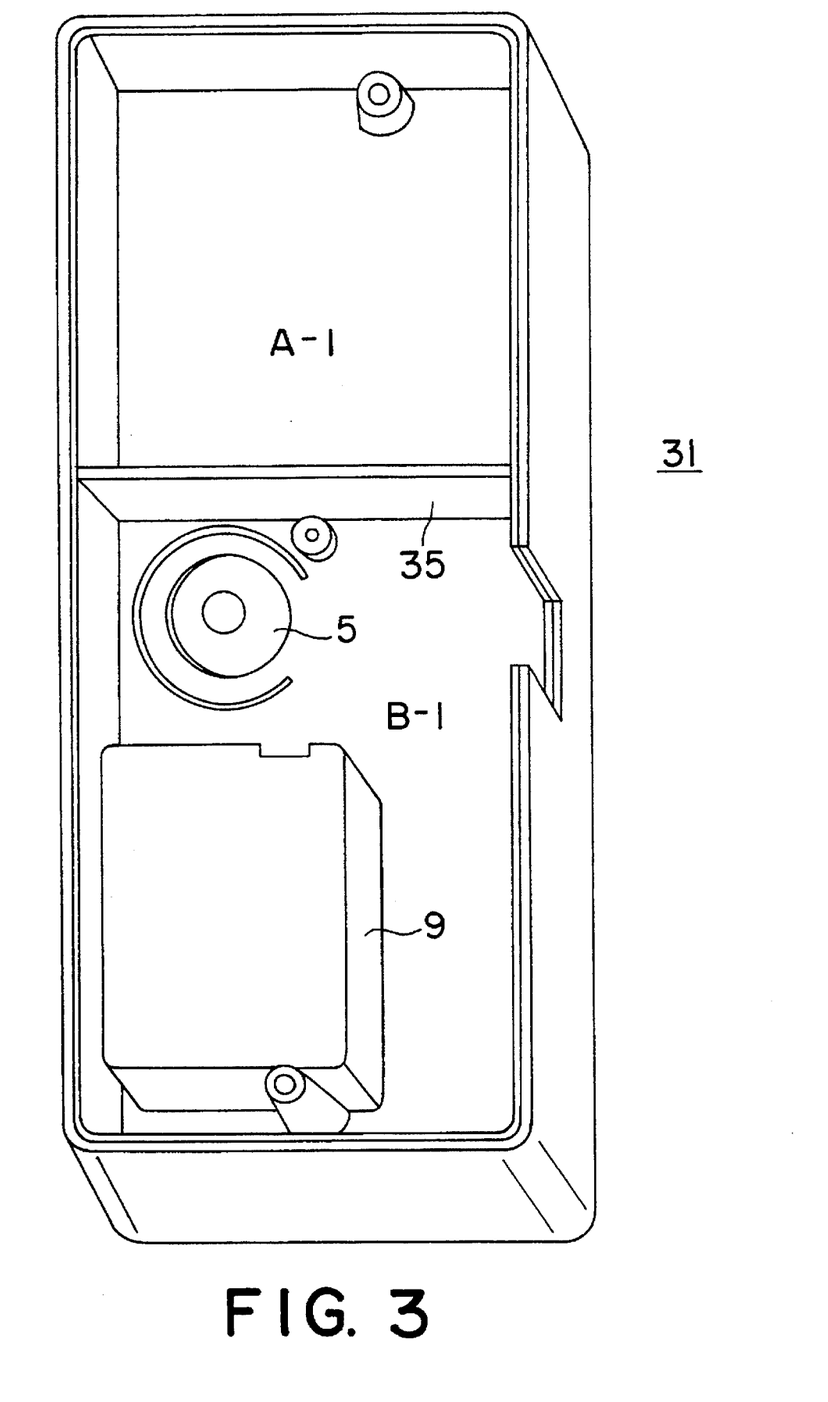
FIG. 3 is an inside view of the bottom half of the housing and components.

FIG. 3 is an inside view of the bottom half of housing 31 showing compartments, A-1 and B-1 separated by a divider 35. Compartment A-1 is adapted to fit over compartment A-2 of the top half of housing 31, seen in FIG. 5. Compartment B-1 contains a 9 volt DC battery or DC power supply 9, space for switch 7 and space for motor 5.

Figure 4:
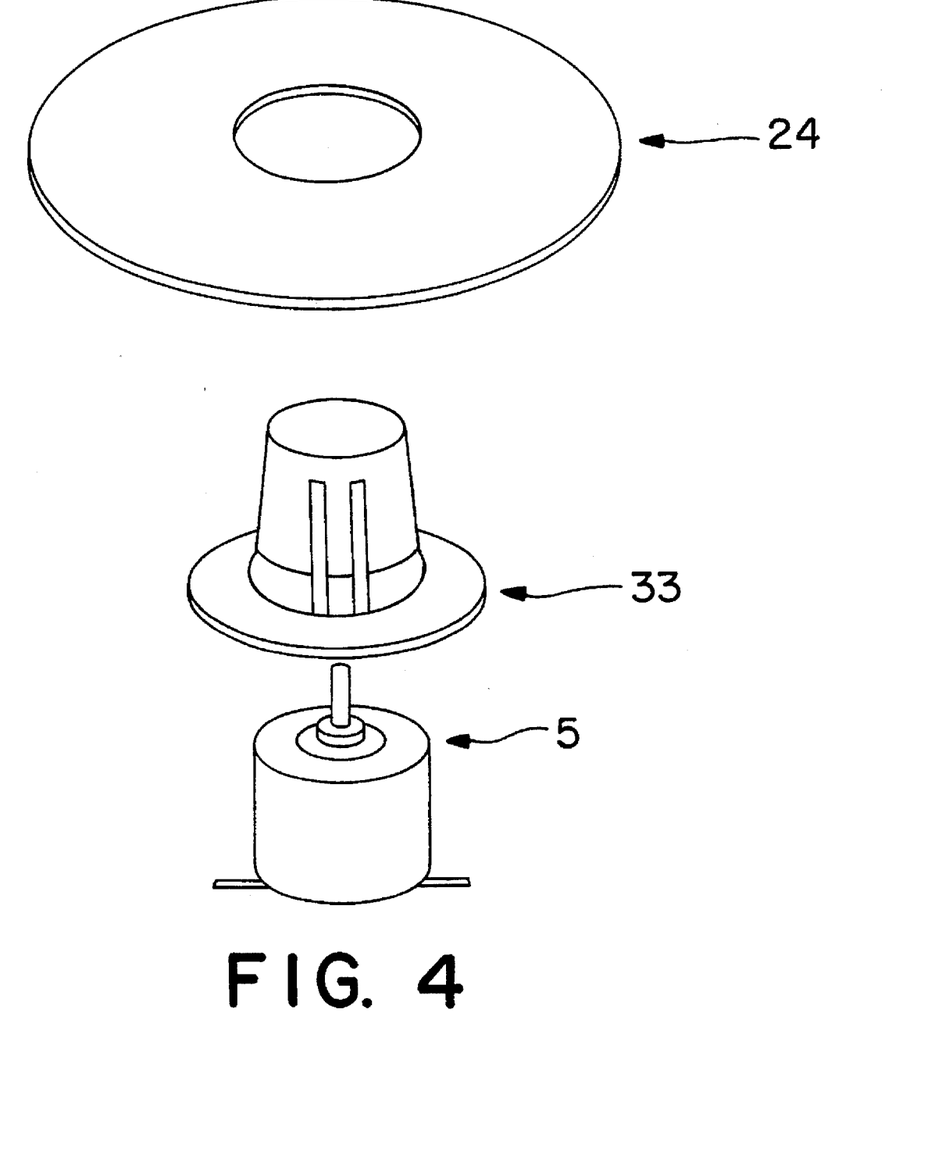
FIG. 4 is a perspective view of the orientation of the conducting medium (compact disc), to a molded spindle.

FIG. 4 is a perspective view showing the orientation of conducting medium 24 to spindle 33 and motor 5.

Figure 5:
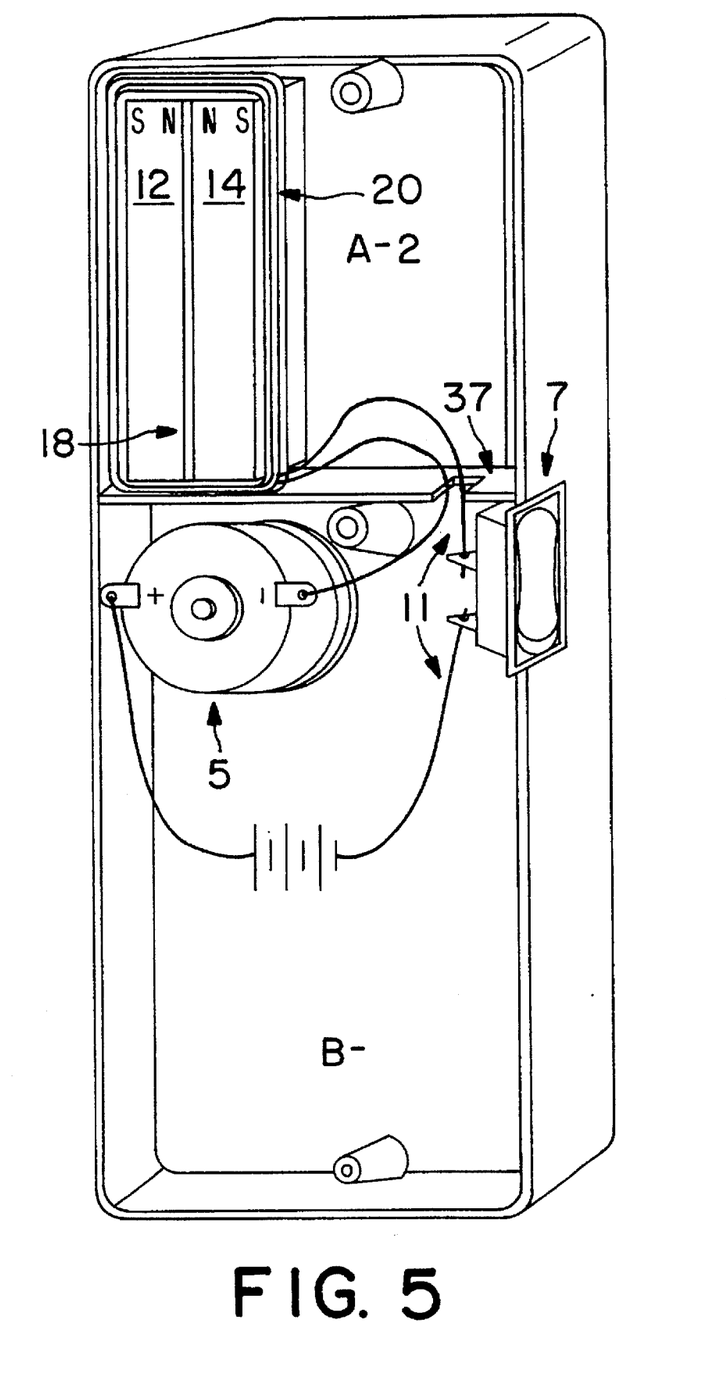
FIG. 5 is an inside view of the top half of the housing and components.

FIG. 5 is an inside view of the top half of housing 31 showing compartments A-2 and B-2 separated by divider 37. Compartment A-2 contains magnetic unit 12 with connecting wire 11 from coil 20. Wire 11 passes through a recess in divider 37 and into compartment B-2 to connect to motor 5 and switch 7. Compartment B-2 contains motor 5 and a side wall of B-2 contains a recess for switch 7. Beneath motor 5 and on the roof of the top half of housing 31 is an opening for the emergence of spindle 33.

Figure 6:
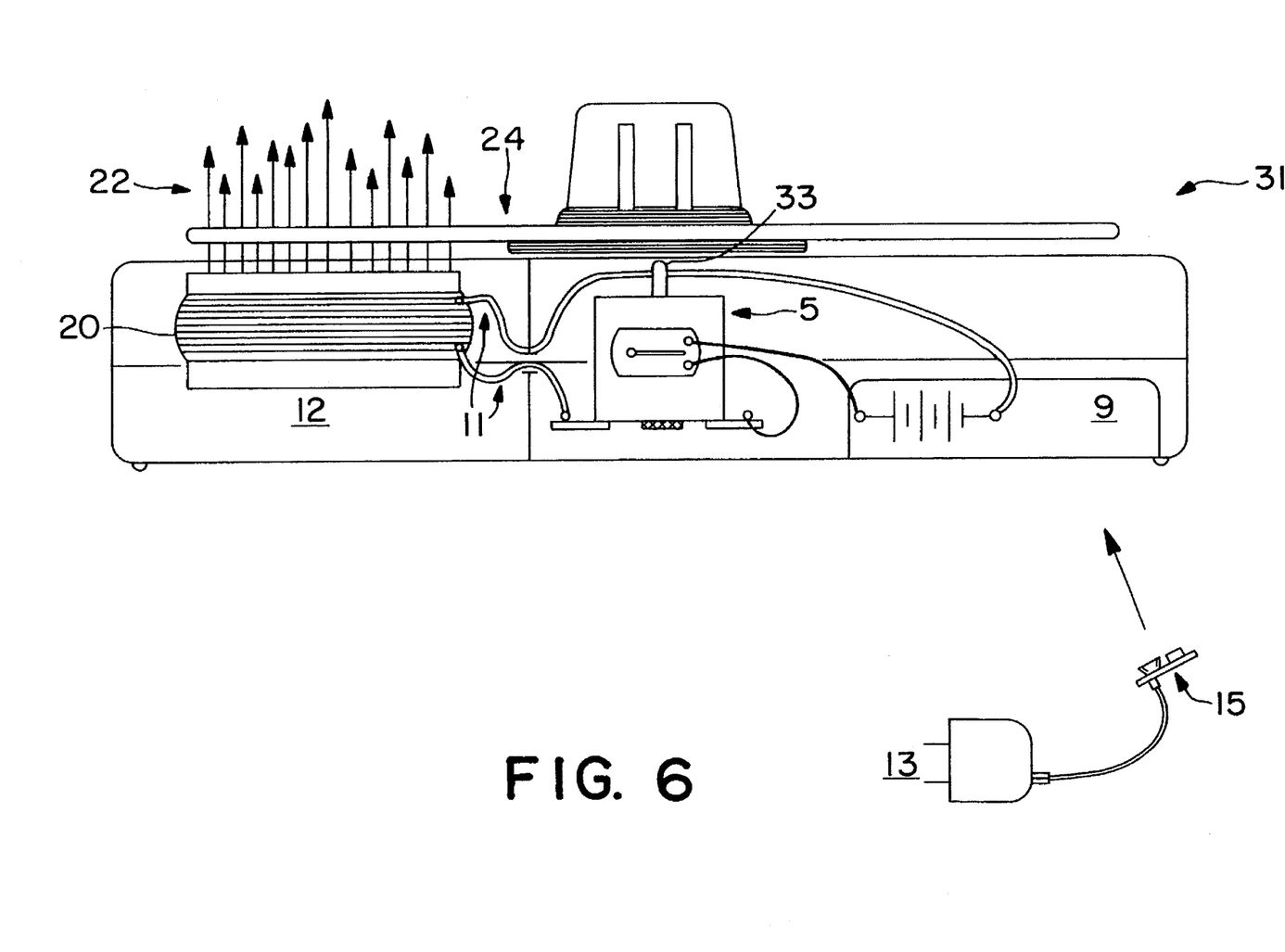
FIG. 6 is a side view of the housing and components.

FIG. 6 is a side view of housing 31 showing the relationship of the various elements to each other. Magnetic unit 12 is located in compartment A-2 of housing 31. Connecting wires 11 connect coil 20 to a 9 volt battery or AC to DC convertor 9 and motor 5. Spindle 33 is connected to motor 5 and emerges through the top of housing 31 to accept conducting medium 24. Conducting medium 24 is shown in close proximity to magnetic unit 12 and oriented in a plane perpendicular to the plane of intersection of magnets 14 and 16 so that when apparatus 10 is activated, the rotating conductor 24 will pass through the modulated EM field 22.

EXAMPLE I

An analysis of an audio compact disc was carried out with the test completed using a Schlumberger 1510 Audio Spectrum Analyzer to display real-time fast fourier transform (FFT) spectra of the sound, a Tektronix 465B dual-trace oscilloscope to display phase differences between left and right stereo channels as well as waveform shapes, and a Leader LMV-185A 2 channel AC Millivoltmeter to simultaneously read the amplitude of the left and right stereo channels. The spectrum analyzer has a frequency range of up to 25 khz, a dynamic range of 70 db, and an absolute range of 100 db using attenuators, and an accuracy of 0.1 db and 1/256 of the frequency range selected. All measurements were made using the 25 khz range. The oscilloscope has an upper frequency range of 100 mhz. The test CD was played on the Denon DCD-1500 II compact disk player connected directly to the above instrumentation.

The test CD, CDP 7 46446 2, DIDX 2249 Stereo, UK: CD-PCS 7078, manufactured by Capitol Records, otherwise known as the *Beatles: Abbey Road* album originally recorded in 1969 and digitally re-mastered in 1987 for CD, was subjected to the above equipment and technique. Spectral measurements at a 00:24 interval was made on track #7, a selection known as "Here Comes the Sun".

Track #7, at a 24 second interval, is exhibited in Example I as a series of bar graphs in diagrams 1–8. The bar graphs simultaneously show the relative loudness in decibels "before" and "after" clarifying of the device. Each pair of bars represents the relative loudness of frequencies between 100 hertz and 25600 hertz of Track #7 time 24 seconds of the audio CD analyzed.

Diagram 1 shows the entire spectrum from 100 to 25600 hertz in 8 frequency bands as labeled at the bottom of the diagram. It is noted that each frequency range except for 200 to 400 hertz is about 1 or 2 decibels louder after processing by the device.

Diagrams 2–8 display the same data in more detail showing a larger number of smaller frequency ranges in intervals of only 100 hertz each. Because frequency ranges are smaller there are more variations in the data, however, the readings show the trend of being 1 to 2 decibels louder after processing.

It is noted that each of the spectral differences as well as the average spectrum difference follow a profile demonstrates the effect that clarifying by the instant device has on the CD.

EXAMPLE II

An analysis of an audio compact disc was carried out by first recording "The Best of Mike Olfield—Elements", track "Portsmouth" without clarifying the CD, on a hard drive using a WAV file of Voyetra's WINDAT software with a sound card connected to a CD-ROM's audio output. The recording was in mono at a sample rate of 44100.

Following the first recording, the CD was then clarified, using the device, by placing the CD in the modulated electormagnetic field of the present device for 10 seconds on each side followed by again recording the CD using the above technique.

Using the WINDAT program, the "before" clarifying and "after" clarifying recordings were trimmed so that application of the device could be easily compared with non-application. Ten second and 0.25 second excerpts were used. The ten second excerpts were measured from the point where sound began to come off of the CD. The 0.25 second excerpts were taken from a consistent point within the body of the recording.

The sound files were converted into graphics using two Shareware programs: Screen Thief and Blaster Master. The recordings were loaded into Blaster Master individually and the graphical representation of each recording was captured using Screen Thief. The graphics of the sound files were then laid down and compared using Deluxe Paint II Enhanced.

The graphical representation of the sounds, in Diagrams 9–11, is based on amplitude and time. The left side of the graphic is the beginning of the recording, and right side is the end. The beginning of the graphic is defined as the point where sound began showing up on the graphic.

Diagram 9 illustrate a 10 second comparison of the unclarified with the clarified CD. The waveform represents amplitude. It is noted that waveform A, the unclarified sample, is taller than waveform B, the clarified sample.

Diagram 10 is of the same recording but compares exclusively unclarified, partial waveform C, unique to waveform A, and clarified partial waveform D, unique to waveform B. That is, all of the points in the unclarified graph, waveform A, that correspond to points in the clarified graph, waveform B, have been erased resulting in waveform C, and all of the points in the clarified graph, waveform B, corresponding to the unclarified graph, waveform A, have been erased, resulting in waveform D. This technique leaves a graph showing the data that is unique to the recording in question. Thus, in Diagram 10, the graph labelled "Exclusively Clarified", the visible lines show data that is unique to the clarified recording, and the "Exclusively Unclarified" graph shows sound or noise that was no longer present after clarification.

Diagram 11 illustrates a 0.25 second comparison of the unclarified CD, waveform E, with the clarified CD, waveform G. Waveform F is the exclusively clarified and shows what is unique to waveform G. A graphic of an exclusively unclarified waveform was eliminated because interest was in the clarified waveform and what is unique to it.

Three criteria were used in analyzing the graphs of Diagrams 9–11: Response Time, Noise level and Density. Response Time refers to "when the sound starts", a key factor because the CD excerpt recorded was timed from the moment that sound began recording off of the CD. The position of the remaining material recorded is dependent on the accuracy of the starting point. In the ten second excerpt of Diagrams 9 and 10, there were no measurable time discrepancies, as the graphs matched up as represented in the Diagrams with the peaks in the sound occurring in the same places throughout the sample.

The 0.25 second excerpts showed a lag time between unclarified waveform E with clarified waveform G. As many of the peaks of waveforms E and G as possible were matched-up and then compared to how much "extra" sound was left at the beginning. By comparing the length of the sound to the length of the whole sample, it was determined that the unclarified 0.25 second excerpt was lagging behind the clarified excerpt by about 0.01 second. A small discrepancy at the starting point would not be visible on the ten second scale, but on the 0.25 second scale is noticeable.

In terms of Noise Level, the unclarified sample was "noisier" in both excerpts, ten second and 0.25. By noise level is meant, that overall, the unclarified sample consistently had several peaks where the volume line went further than the corresponding volume line in the clarified sample. This lower level in the clarified sample is the result of a reduction of "noise" level in the clarified sample. Extraneous noise makes the overall signal noisier and less clear. The clarified sample has an improved and smoothed out dynamic because of a reduction in noise level.

Density is defined as the solidity of the volume or amplitude lines rather than the range of the lines. Comparison of the volume lines of waveform A, unclarified, with waveform B, clarified, shows waveform B to have a much more consistent volume level than waveform A. Increased Density gives greater consistency to the CD, producing a much fuller sound.

EXAMPLE III

In Example III, the identical technique used in Example II was duplicated. An analysis of the audio compact disc, "The Cross of Changes" by Enigma, track "Return to Innocence" was carried out by first recording, without clarifying the CD, on a hard drive using a WAV file of Voyetra's WINDAT software with a sound card connected to a CD-ROM's audio output. The recording was in mono at a sample rate of 44100. Following the first recording, the compact disc was then clarified, using the device, by allowing the CD to spin for 10 seconds on each side followed by again recording the CD using the above technique. The analysis technique as described in Example II was then completed.

Diagram 12 illustrates a ten second excerpt comparison of waveform A, unclarified, with waveform D, clarified. Waveform B is exclusively unclarified, and unique to waveform A. Waveform C is exclusively clarified and is what is unique to waveform D of the sound track. Waveform A, the unclarified sample, is significantly different than waveform D, the clarified sample.

Diagram 13 illustrates a 0.25 second comparison of the same recording of unclarified waveform E with clarified waveform G of the CD. It also shows exclusively clarified waveform F, demonstrating the unique difference between waveforms E and G.

Response Time, Loudness and Density were analyzed. In the 0.25 graphic of Diagram 13, the Response Time of waveform G is slightly ahead of waveform E, indicating that sound from the recording began sooner than in waveform E. The amplitude lines of waveform G are slightly reduced overall in comparison with waveform E, resulting in a reduction of Noise Level. The Density of waveform G is much greater than in waveform E, especially in the last one-third segment of Diagram 13.

EXAMPLE IV

A Photo-CD was analyzed both "before" and "after" passing the CD through the modulated eletromagnetic field of the device to determine specific changes in the retrievable data from the CD. The method and steps used to derive and quantify the effect that clarifying had on the conductor was determined using the following method and steps:

1. A demonstration Photo-CD sampler, produced by Kodak, was down loaded to the hard drive of an Apple Centris 650, 25 HRZ, 6800040 motherboard and a new file created and properly designated as "before". The photo-CD had not been clarified by the device. Images were transferred to a commercial graphics software program, PhotoShop, developed by Adobe Software.
2. The Photo-CD was removed from the ROM and treated with the present device by spinning the CD on each side for 15 seconds. The CD was then down loaded to the hard drive and a second new file created and properly designated as "after". The images created were transferred to the PhotoShop graphics software program with file separation maintained at all times.
3. Print number 3 of the Photo-CD list, contained in the "before" or unclarifyied, was brought to the screen and a text translator was used to convert the picture to post script computer language. Picture number 3 represented a photo image that measured 2½×1¾ inches, using 132 LPI, 72 DPI and utilized approximately 250K of memory. Following the text translation process to convert the small image to post script, it was then saved to a new file. Following the conversion, there were 360 pages of post script computer language created to describe the image number 3.
4. The identical process as described above was used to create a post script file for the image following use of the device on the photo-CD. The "after" or clarifying effect resulted in 348 pages of post script computer language.
5. The first 16 pages of post script language was specific to language to program the printer. The balance of the pages in both cases was post script language to describe the specific image that was converted. The first 4 pages of both files were then converted into text files using Wordperfect 6.0. The process of converting the post script files to text files was for the specific purpose of utilizing a specialized software program that could compare the text language of both files. The process of converting the first 4 pages of both post script files to text files took 25 minutes and resulted in the generation of 101 pages of new text language. The ratio of pages of text converted from post script is approximately 1 to 25. If the entire post script files (354 pages average) were converted to text file using the same ratio, it would require approximately 8,850 pages of text file to fully describe a single 2½×1¾ inch colored image.
6. The software used to simultaneously compare the text in the two files, DocuComp II, version 1.05, is a product of Advance software, Inc.
7. The first 4 pages produced a total of 101 pages of text file. When placed into the DocuComp file, it resulted in the following summary of information changes: The 4 pages represent slightly more than 1% of the total data available from each image. If the entire 708 pages were converted and analyzed, it would take considerable memory capacity and about 37 hours (4 pages of each file takes 25 minutes) of computer running time to analyze 708 pages of post script computer language.
8. Four pages from each file generated a total of 56 material changes, on the average, resulting in over 5,000 changes for the entire image when "before" clarifying was compared to "after" clarifying.
9. The "before" unclarified file, resulted in 53,336 bytes of information The "after" clarified file version, generated 50,521 bytes of information. The comparison represents a difference in information retrieved equal to 5.7% less for the clarified file.

Clarifying the Photo-CD with the device realigns the data into a tighter format by reducing superfluous data. Each Pixel has a "halo" or influence zone. Exposing the pixel to a modulated EM field reduces the halo by suppressing electron activity or relaxation noise thus causing the pixel to be sharper with improved clarity. The photo-CD manufacturing process can produce residual color around each individual pixel referred to as pixel residual or bleeding. When a pixel, represented by post script and text script, is sharper, it does not require as much information to accurately describe or define it. When a pixel halo or influence zone is reduced, it requires less information to describe the data. In Example IV, 5.7% less information was required following clarifying by the device, at the same time improving the image to describe the same segment of the picture.

The analysis process of converting each image to post script and then to text is accurate. Changes created by treating a photo-CD with the present device can be demonstrated by a computer comparison of the information generated from both images.

Diagram 14 is a Summary of Post Script Changes with a list of differences between the "before" and "after" application of the device to the photo-CD.

EXAMPLE V

Using the identical technique and steps as described in Example IV, steps 1–9, a second Photo-CD, Nature's Way, published by Gazelle Technologies and produced by Kodak, was tested "before" and "after" application of the present device. In this Example, the original bytes numbered 74,151 before clarifying with the device. After clarifying, the number of bytes were reduced to 70,214 resulting in a 5.6% byte reduction.

Diagram 15 is a Summary of Post Script Changes with a list of differences between the "before" and "after" application of the device to the photo-CD.

Diagrams 16 and 17 are black and white, "before" and "after", copies of color pictures of the photo image of the photo-CD, demonstrating the effect that clarifying the conducting medium has on the comparable results.

Finally, although the invention has been described with reference of particular means, materials and embodiments, it is to be understood that the invention is not limited to the particulars disclosed and extends to all equivalents within the scope of the claims.

What is claimed is:

1. An apparatus for reducing relaxation noise in an information recording medium comprising:
   a. means to produce a non-visible modulated electromagnetic field; and
   b. means to rotate said information recording medium through said modulated electromagnetic field.

2. An apparatus according to claim 1, wherein the means to produce the modulated electromagnetic field comprises an electrical modulating means and a means to produce a magnetic field.

3. An apparatus for reducing relaxation noise in an information recording medium comprising:
   a. magnetic means comprising two or more magnets positioned in an orientation in which like poles, north or south, are in a facing and repelling relationship;
   b. electrical modulating means in contact with said magnet means to produce a non-visible modulated electromagnetic field; and
   c. means to rotate the information recording medium through said modulated electromagnetic field.

4. An apparatus according to claim 3, wherein said electrical modulating means comprises a coil of wire, said coil connected to an electrical motor to produce a proper waveform through a series connection with an electrical means to produce said modulated electromagnetic field.

5. An apparatus according to claim 4, wherein said coil of wire is in contact with said magnetic means in an orientation transverse to the pole faces.

6. An apparatus according to claim 5, wherein said coil in contact with said magnetic means is perpendicular to a plane extending between said magnets.

7. An apparatus according to claim 4, wherein said coil comprises enamel-insulated high temperature wire.

8. An apparatus according to claim 4, wherein said coil comprises 150 to 300 turns of wire.

9. An apparatus according to claim 3, wherein said information recording medium is an audio compact disc.

10. An apparatus according to claim 3, wherein said information recording medium is a video laser disc.

11. An apparatus according to claim 3, wherein said information recording medium is a photographic compact disc.

12. An apparatus according to claim 3, wherein said information recording medium is a CD-ROM.

13. An apparatus according to claim 3, wherein said information recording medium is a photographic film.

14. A method for reducing relaxation noise in an information recording medium comprising rotating said information recording medium through a non-visible modulated electromagnetic field.

15. The method according to claim 14, wherein the information recording medium is an audio compact disc.

16. The method according to claim 14, wherein said information recording medium is a video laser disc.

17. The method according to claim 14, wherein said information recording medium is a photographic compact disc.

18. The method according to claim 14, wherein said information recording medium is a CD-ROM.

19. The method according to claim 14, wherein said information recording medium is a photographic film.

* * * * *